United States Patent [19]

Öberg

[11] 4,390,314
[45] Jun. 28, 1983

[54] CONTAINER TRUCK FOR LIFTING AND CARRYING AWAY A CONTAINER

[75] Inventor: Lars G. Öberg, V. Frölunda, Sweden
[73] Assignee: Dynatrans AB, Hisings Backa, Sweden
[21] Appl. No.: 220,048
[22] PCT Filed: Apr. 22, 1980
[86] PCT No.: PCT/SE80/00120
    § 371 Date: Dec. 12, 1980
    § 102(e) Date: Dec. 12, 1980
[87] PCT Pub. No.: WO80/02264
    PCT Pub. Date: Oct. 30, 1980

[30] Foreign Application Priority Data
    Apr. 23, 1979 [SE] Sweden ............................ 7903524

[51] Int. Cl.³ .............................................. B60P 1/50
[52] U.S. Cl. .................................. 414/547; 180/326; 280/43.23; 280/43.24
[58] Field of Search .............. 414/541, 542, 543, 547, 414/549, 680, 728; 280/43.23, 43.24

[56] References Cited
U.S. PATENT DOCUMENTS 3,048,284 8/1962 Cissna .
3,240,008 3/1966 McMullen .................... 280/43.23 X
3,528,675 9/1970 Brown ............................ 280/43.23

FOREIGN PATENT DOCUMENTS 2651936 5/1978 Fed. Rep. of Germany .

Primary Examiner—Robert G. Sheridan
Attorney, Agent, or Firm—Laurence R. Brown

[57] ABSTRACT

A container truck for lifting up a container (13) into position on the truck (1) for subsequent transport. In order to achieve a simple and cheap construction without a counterweight, an end portion (15) of the truck (1) in contact with the container (13) can be brought to bear against the support for the truck during the lifting of the load into a transport position on the truck, in that there are hydraulic cylinders (16) between the wheel axle and the truck.

1 Claim, 3 Drawing Figures

CONTAINER TRUCK FOR LIFTING AND CARRYING AWAY A CONTAINER

TECHNICAL FIELD

The present invention relates to a so-called container truck for lifting up a container (or other unit load) into position on the truck for subsequent transport.

PRIOR ART

Previously known container trucks are equipped with at least two axles provided with wheels, a lifting device of a suitable kind and a platform or the like for the container.

During loading, the container truck is driven as close as possible to the container and a lifting beam or the like on the lifting device of the truck is fixed to the container which is then lifted up and in to the container platform.

Since some portion of the truck generally projects forwards the distance between the supporting point of the truck on the ground nearest to the container (the ground contact of the nearest wheel, that is to say the tipping centre of the truck) and the centre of gravity of the container is normally the wheel radius plus the length of the projecting portion of the truck plus half the width of the container.

In order to render possible the lifting of heavy containers (weight for example 30 tons), the truck must be provided with a considerable counterweight (for example 20 tons), which, with the truck's own weight (for example 20 tons) not only produces a heavy truck (total 40 tons) with the consequent unnecessarily high price but also the need for a much stronger construction, which also increases the price of the truck unnecessarily. The great weight means that the volume of the truck is increased and that its manoeuvrability is reduced, inter alia because there is a heavy demand on the carrying capacity of the chassis.

THE INVENTION

The distance between said supporting point of the truck on the ground (tipping centre) and the centre of gravity of the container can be reduced to half the container width and the need for counterweights on the truck can be eliminated if, according to the invention, an end portion of the truck adjacent to the container is brought to bear against the support for the truck during the lifting of the container to the transport position on the truck, in that between the axle for the wheels of the truck nearest to the container and the truck there are members, preferably fluid pressure actuated members, for lowering and raising the truck in relation to the axle.

Going back to the above example of a container weight of 30 tons, the weight of the truck hereby can be reduced to half from 40 tons to 20 tons. It is easy for the expert to see what advantages this leads to in the form of simpler contruction, lower price and improved utility.

Only a so-called container truck has been mentioned above but the invention can also be used with other vehicles for the lifting and transport of so-called unit loads or corresponding loads. One example of such a vehicle is a combination of a towing vehicle and a lifting apparatus articulately fixed thereto, when the lifting apparatus is adapted according to the invention.

BRIEF DESCRIPTION OF THE DRAWINGS

The invention will be described in more detail below with reference to the accompanying drawings in which.

DESCRIPTION OF PREFERRED EMBODIMENTS

Figure 1:
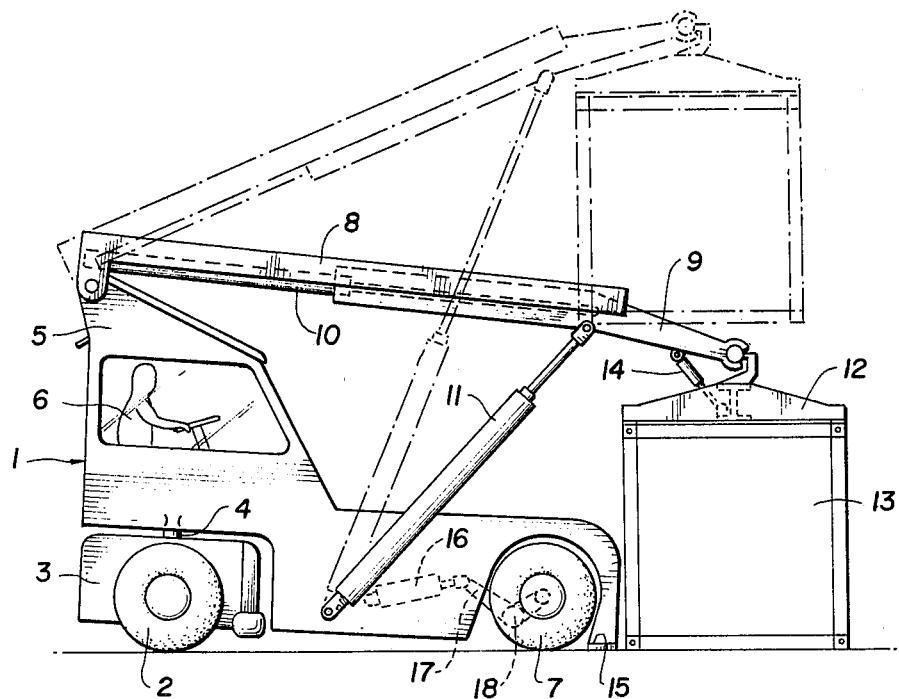
FIGS. 1 and 2 show a container truck according to the invention in a side view in the loading and unloading position and the transport position respectively.
Figure 2:
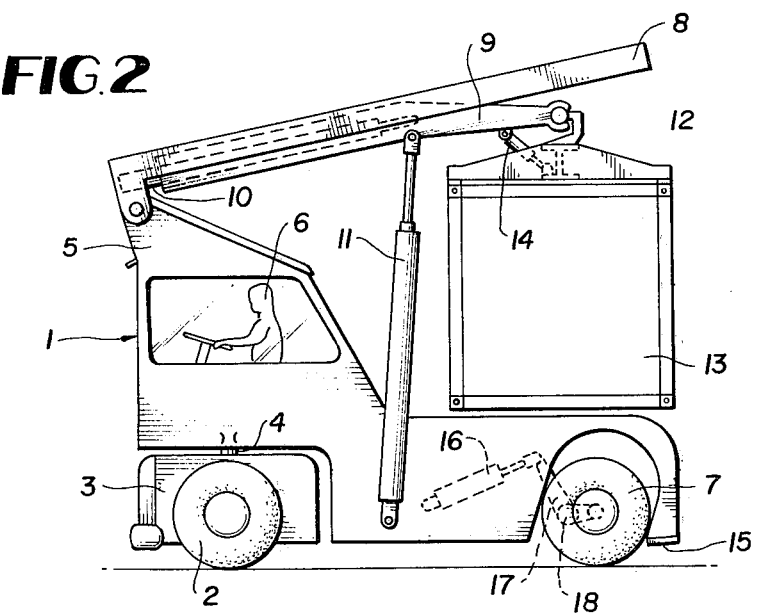

A preferred container truck according to the invention is shown in different working positions in FIGS. 1 and 2; for the sake of clarity, the reference numerals only appear in FIG. 1 (with one exception).

The container truck, which bears the reference numeral 1, has two axles of which one—the left-hand one in FIG. 1—has driving wheels 2 and is mounted on a drive motor housing 3. This housing is pivotable about its axle 4 together with the whole operating place in a cabin 5 for a driver 6, as can be seen from a comparison between FIGS. 1 and 2. In FIG. 1, the drive motor housing 3 and the operating place for the driver 6 are turned into the position for loading and unloading and in FIG. 2 into the position for transport.

The right-hand axle in FIG. 1 has wheels 7 and has a special construction as will be seen below.

Disposed on the upper portion of the cabin 5 is a so-called projection mast, consisting of a portion 8 articulately connected to the cabin 5 and a movable portion 9 which can be displaced backwards and forwards therein. This displacement movement can be brought about by means of a hydraulic cylinder 10 which works between the two portions 8 and 9 in a conventional manner.

A lifting hydraulic cylinder 11 is disposed between the truck 1 and the projecting mast 8, 9 (in the case shown its movable part 9).

The oil pressure needed for the operation of the cylinders 10 and 11 can be produced by means of a motor in the truck 1 itself, where the other necessary oil system equipment can also be placed.

A lifting beam 12 for a container 13 or other load (preferably of the unit type) can be articulately disposed in the movable portion 9 of the projecting mast.

A third hydraulic cylinder 14 can be disposed between the movable portion 9 of the projecting mast and the lifting beam 12, as shown in FIG. 2, with the object of stabilizing the beam 12 with its container 13 during handling and holding it in the correct position despite an unbalanced load.

The right-hand axle shown in FIG. 1 with the wheel 7 is provided with members shown in broken lines, preferably hydraulic manoeuvring members, to manoeuvre the truck 1 between two working positions: a loading and unloading position as shown in FIG. 1 with the end portion 15 of the truck 1 in contact with the container 13 lowered to rest on the ground and a transport position as shown in FIG. 2 with the same end portion raised from the ground so that the truck 1 has a normal horizontal position.

This manoeuvring member consists of a hydraulic cylinder 16 which is articulately connected to the chassis of the truck by its left-hand end, and the piston rod of which is articulately secured to the one arm of a bell-crank lever 17, the other arm of which is connected to the axle of the wheel 7 and the centre 18 of which is pivotally secured to the chassis of the truck. With this construction it is obvious that an extension of the piston rod of the hydraulic cylinder causes a clockwise turning of the bell-crank lever 17 and therefore a lifting up of the truck into the position shown in FIG. 2.

As can be seen from FIG. 1 (and to some extent FIG. 2), the lifting of the container 13 (with the end portion 15 of the truck 1 supported against the ground) takes place in an entirely conventional manner by means of the two hydraulic cylinders 10 and 11 for the projecting mast 8, 9, the position shown in dotted lines in FIG. 1 indicating an intermediate position, before the container 13 is placed on the truck, which is then raised to the transport position as shown in FIG. 2. A following unloading takes place in reverse sequence, again with the end portion 15 lowered to the ground.

It should be noted that the container 13 is shown in FIG. 2 somewhat above the truck 1 in the transport position; but the container does in fact rest on the truck.

Figure 3:
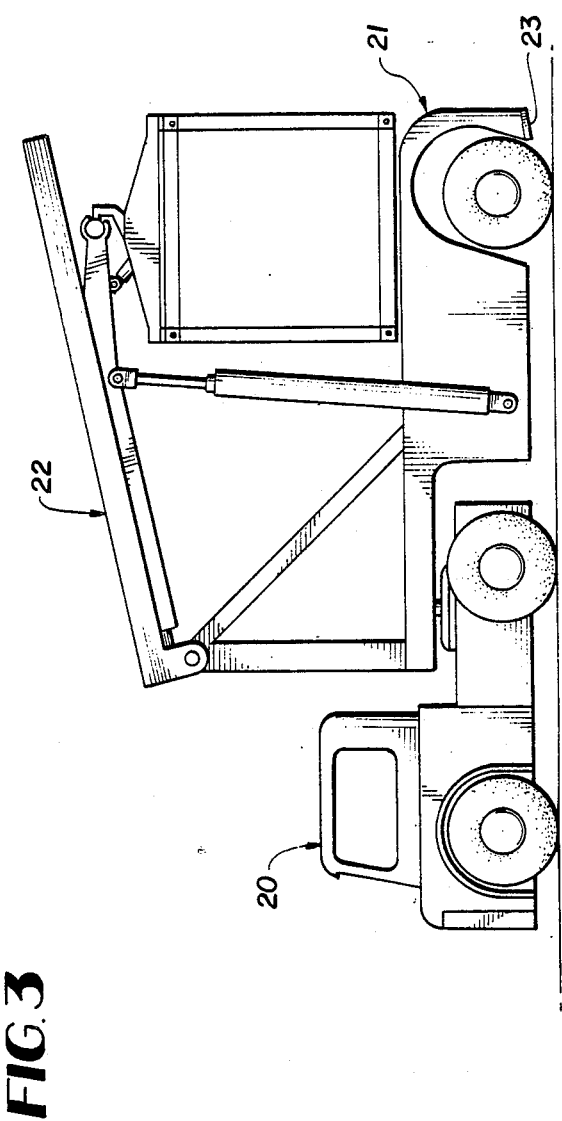
FIG. 3 shows another vehicle according to the invention in a side view.

FIG. 3 indicates that the same technique can also be used for other unit-load conveying vehicles than a container truck, namely, in the case shown, a vehicle consisting of a towing vehicle 20 and a lifting apparatus 21 articulately secured thereto. The towing vehicle has the necessary driving and steering members while the lifting apparatus is provided with a projecting mast 22 of the same type as that described above, so that further description is not needed.

In the same manner as the truck 1 (FIG. 1), the lifting apparatus 21 is provided with members for lowering and raising an end portion 23 into and out of contact with the ground.

It should be noted that the invention is not restricted to the constructions shown and described for lifting, driving etc. but that the invention lies in the manner for displacing the tipping centre of the vehicle during loading and unloading.

What is claimed is:

1. A four-wheeled container lift truck for lifting heavy loads onto the truck, comprising in combination, crane type means mounted on said truck for lifting up a container supported on a common surface with the truck into position on the truck body for subsequent transport, a single pair of truck wheels on an axle for supporting the truck on the surface being positioned near one end portion of the truck to be placed closely adjacent the container, and means for selectively moving an end load bearing portion of the truck at said one end adjacent to the container between said pair of wheels and the container to bear against the support surface for the truck during the lifting of the container to the transport position on the truck comprising a mechanism for lowering and raising said truck wheels to change the load supporting position between said wheel and said end portion of the truck body thereby to change the tipping center of the truck for permitting heavier containers to be lifted onto lighter weight trucks without counter weights.

* * * * *